March 20, 1956 O. E. ROSAEN 2,738,774
MOTOR
Filed Jan. 22, 1953 4 Sheets-Sheet 1

INVENTOR
Oscar E. Rosaen

BY

ATTORNEYS

March 20, 1956 O. E. ROSAEN 2,738,774
MOTOR
Filed Jan. 22, 1953 4 Sheets-Sheet 2

INVENTOR
Oscar E. Rosaen

BY
ATTORNEYS

March 20, 1956　　　O. E. ROSAEN　　　2,738,774
MOTOR

Filed Jan. 22, 1953　　　　　　　　　　　4 Sheets-Sheet 3

INVENTOR
Oscar E. Rosaen

BY

ATTORNEYS

March 20, 1956 O. E. ROSAEN 2,738,774
MOTOR
Filed Jan. 22, 1953 4 Sheets-Sheet 4
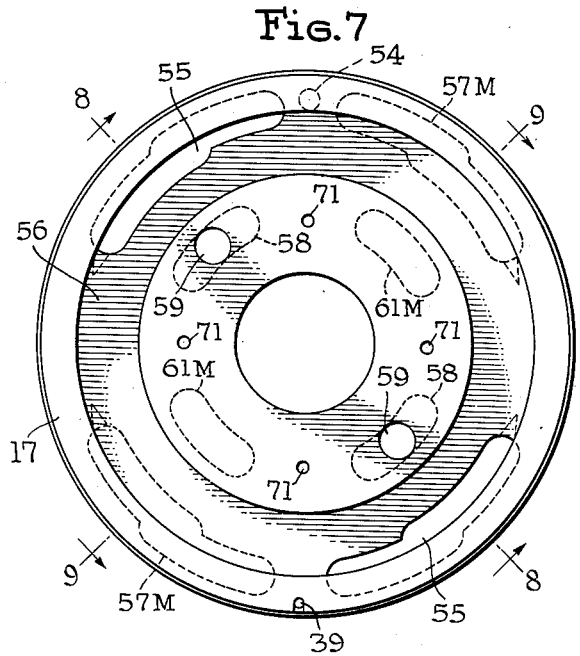
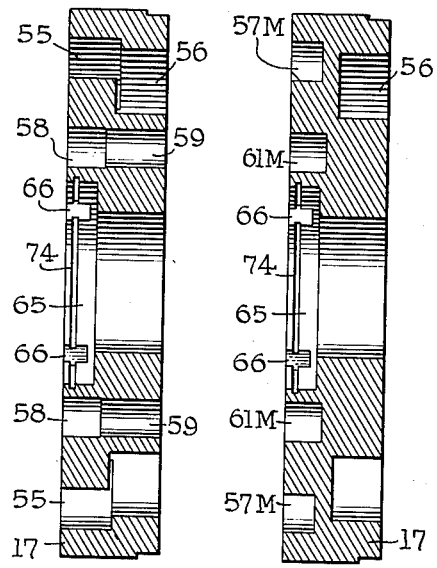
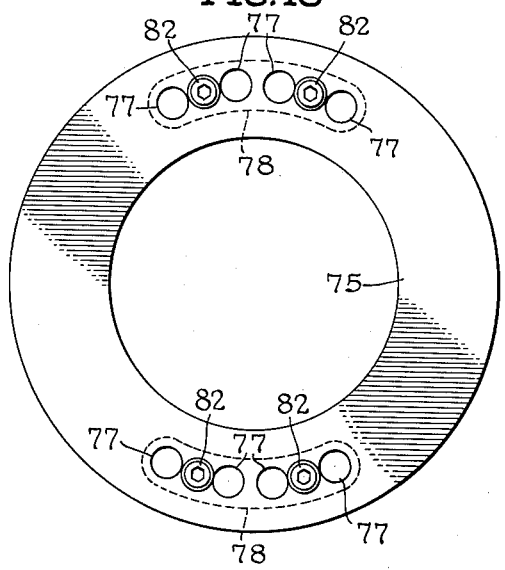
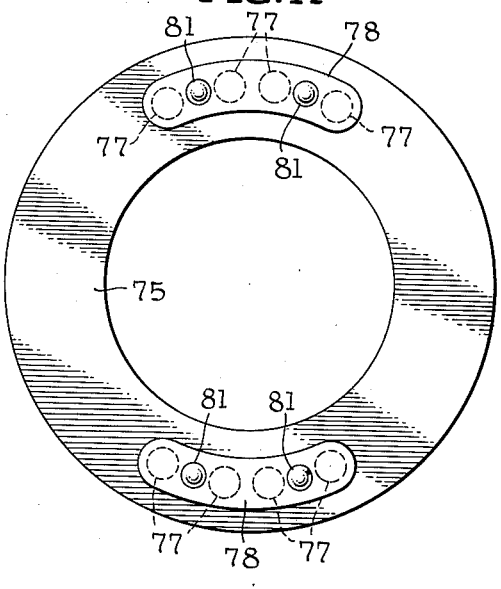
INVENTOR
Oscar E. Rosaen
BY
ATTORNEYS

United States Patent Office 2,738,774
Patented Mar. 20, 1956

2,738,774
MOTOR

Oscar E. Rosaen, Detroit, Mich., assignor to The New York Air Brake Company, a corporation of New Jersey Application January 22, 1953, Serial No. 332,595

4 Claims. (Cl. 121—92)

This invention relates to motors of the vane type and particularly to motors in which an oval cam ring is used to provide two diametrically opposite working spaces and thus afford a balanced driving couple which minimizes bearing loads.

As ordinarily constructed the oval internal surface of the cam ring comprises two opposed arcuate portions, which are closely spaced from the periphery of the rotor and define what are called idle zones. Displaced ninety degrees from the idle zones are two opposed working zones, in which arcuate portions of the ring surface are rather widely spaced from the periphery of the rotor. Between each end of each idle zone and an end of the adjacent working zone is a transition zone in which the vanes move outward or inward as the case may be. There are four transition zones.

In a prior application, which has since been issued as Patent 2,653,551, September 29, 1953, this applicant describes a vane motor having at least 12 vanes, and characterized by the fact that there are always at least two vanes moving through each working zone between the inlet and discharge ends thereof. In the prior application above mentioned, the vanes are moved outward as they pass through the inlet transition zone by hydraulic pressure under the full pressure delivered to the motor. When the vanes reach the working zone their slots are disconnected from supply pressure and the liquid in the slots is trapped. This affords only very light hydraulic loading of the vanes, but there is considerable centrifugal loading. The arrangement contemplates some slip, but since the slip is resisted by at least two vanes the amount is not serious. For reasons explained in the application, very satisfactory action is attained.

There are important reasons for using the smallest practicable number of vanes where pressures and rotary speeds (either or both) are high. The outstanding reason for reducing the number of vane slots is the fact that the strength of the rotor can be materially increased, and still the slots can be deep enough to give good vane support and permit desirably large vane projection. Heretofore, so far as applicant is advised, twelve vanes have been considered the practicable minimum. Eight is theoretically possible, but offers no margin of safety and so is undesirable. An odd number of vanes, such as nine, is undesirable because motor action would not be perfectly balanced.

The motor of the present invention has ten vanes, and is characterized by the fact that for most of the time there is only one vane in each of the working zones, between inlet and discharge. Since a single vane takes the entire load, the vane must be adequately loaded outward and hydraulic loading is resorted to. The principal novelty in this application centers around a scheme which affords smoothly graduated loading and unloading of the vanes.

The supply pressure fluid is reduced by two distinct pressure-reducing valves to two different pressures so that in the motor three pressures are available. These are the full supply pressure, used to load the vanes while they are moving outward in transition zones from an idle zone to a working zone, an intermediate pressure, called hereinafter the "maintaining pressure," used to load vanes passing through the idle zones and the working zones and a still lower pressure used in the intervane spaces to drive the rotor and consequently called hereinafter the "motive pressure." Vanes forced inward by the cam ring in the transition zones are completely unloaded by ports which connect their slots freely with discharge.

As a consequence, the vanes do not hammer the track as they move out, they do not chatter as they are forced in, and they are loaded so smoothly that adequate sealing is assured even at high rotary speeds. The volumetric efficiency is good and wear characteristics are excellent.

The operation of such a motor is remarkably smooth and quiet, possibly because the fluid at motive pressure flows continuously. The maintaining pressure, because it is effective in the idle zone, keeps the slots liquid filled. The flow of liquid to the slots at supply pressure is nearly continuous because the vane interval just spans a transition zone and the amount of such flow is minimum because the slots are full of liquid when flow under supply pressure starts.

A contributing factor is that when the vane is held inward by the track in the idle zone, the clearance under the bottom of the vane is very small. In the drawings the clearance is necessarily shown exaggerated. Commercially it is held to within two to three one-thousandths of an inch. As a consequence the vane never gets what might be described a running start in its outward motion.

An incidental advantage of the use of ten vanes is that the number ten is not divisible evenly by four. The significance of this will be understood if one considers that in a twelve vane motor, because 12 is evenly divisible by four, and because of the spacing of the transition zones, the vane shocks incident to motion over the transition portions of the cam ring, synchronize. With ten vanes they do not.

A commercial embodiment of the invention will now be described by reference to the accompanying drawings.

Fig. 7 is a back view of one of the cheek plates. In the running description it will be assumed that Fig. 7 shows the right hand cheek plate of Fig. 1.

Fig. 8 is a diametric section on the line 8—8 of Fig. 7 looking in the direction of the arrows.

Fig. 9 is a similar section on line 9—9 looking in the direction of the arrows.

Fig. 10 is a view of one face and Fig. 11 is a similar view of the opposite face of one of the asymmetric flow valve units, two of which are shown in Fig. 1. Fig. 11 shows that face of the unit which is toward the rotor.

Figure 1:
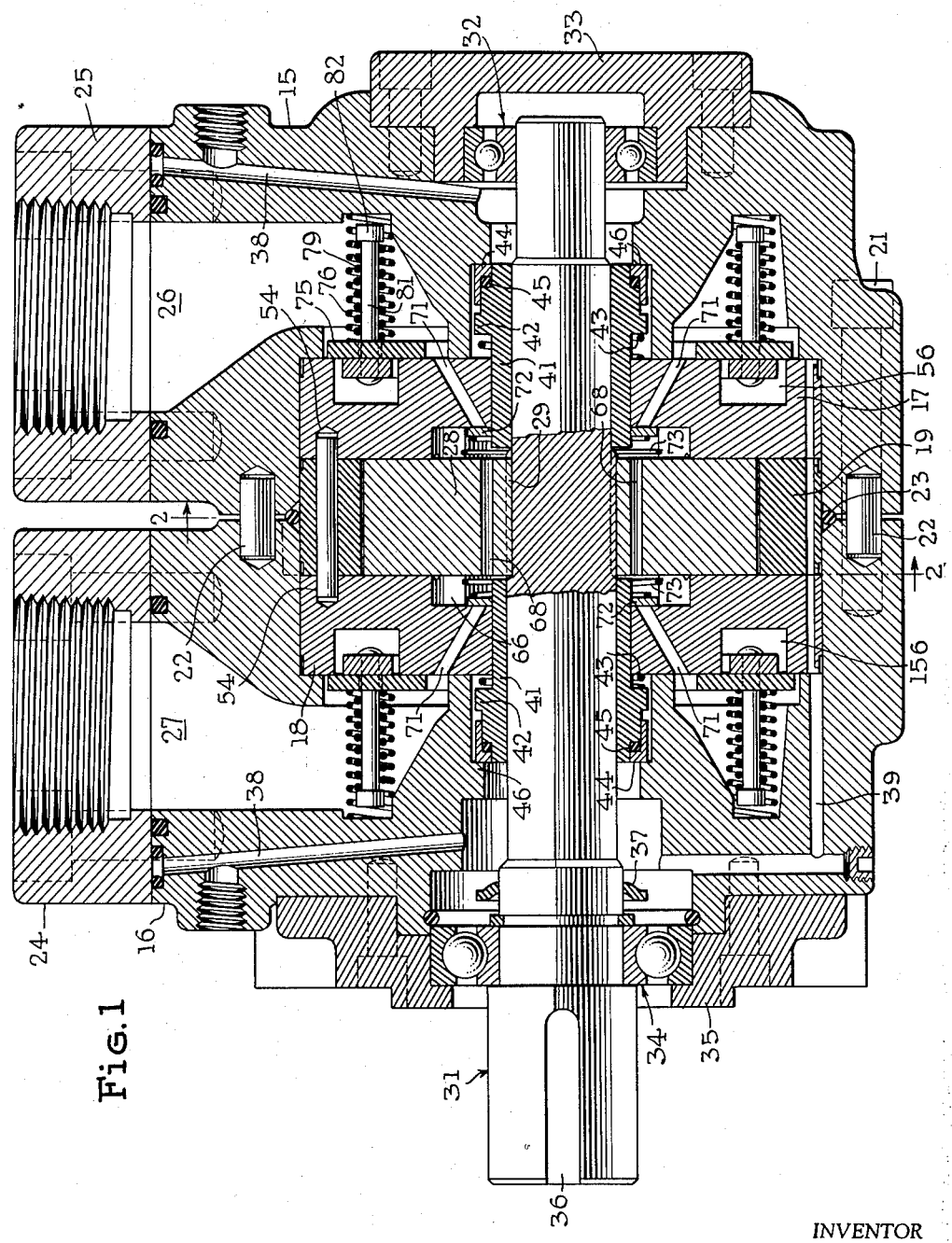
Fig. 1 is an axial section through the complete motor.
Figure 2:
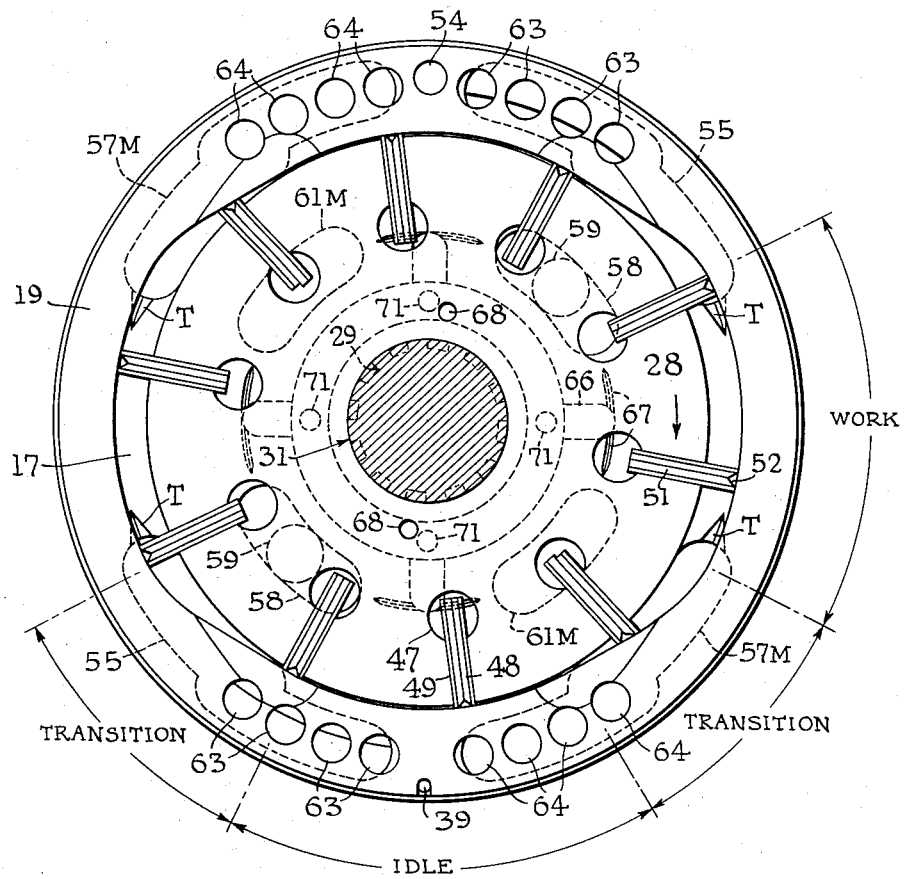
Fig. 2 is a fragmentary view on a scale larger than that of Fig. 1 showing the motor with its vanes and the cam ring as they would appear in a section taken on the line 2—2 of Fig. 1, and looking in the direction of the arrows. In this view the ports in the cheek plate beyond the rotor are indicated in dotted lines.
Figure 3:
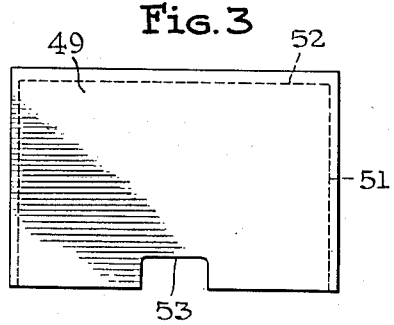
Fig. 3 is a face view of one of the vanes drawn on a still larger scale than that of Fig. 2.

The general construction is best shown in Fig. 1 and the timing of events in Fig. 2 and to these figures reference should now be made, particularly Fig. 1.

The housing comprises two parts 15 and 16 bored and counterbored as clearly shown in the drawing to receive position and clamp an assembly made up of a disc-like ported cheek plate 17, an identical cheek plate 18 and an interposed cam ring 19. The parts of the housing are connected by bolts 21 and are held aligned by dowels 22. A toric gasket 23 of rubber-like material encircles the cam ring and is compressed in a triangular groove formed in the parts 15, 16 to receive it.

Two threaded pipe flanges 24, 25 are bolted to the parts 15 and 16 and sealed by gaskets. These flanges are threaded for supply and discharge pipes which lead to flow chambers 26, 27 each of which completely encircles the shaft hereinafter described. Either of these may be the supply chamber and the other discharge, for the motor is reversible by merely reversing flow.

In the running description repetition may be avoided by assuming that 26 is the supply chamber until the description is completed, at which time reversibility will be apparent.

A disc-like cylindrical rotor 28 turns between the cheek plates 17 and 18 and within the cam ring 19, the thickness of the ring exceeding the axial dimension of the rotor sufficiently to afford a running fit.

The rotor 28 is splined at 29 on shaft 31 and is free to center itself between the cheek plates. The shaft is sustained by two annular ball bearings of which the bearing 32 is sustained in a blind mount 33 bolted to part 15 and the bearing 34 is sustained in annular mount 35 through which the shaft projects to afford a driving connection typified by the key-way 36. Mount 35 is bolted to part 16, and encloses a conventional oil seal 37. The spaces enclosing bearings 32 and 34 have oil overflow ports indicated at 38. The showing in the drawing is clear and no novelty is claimed for this detail. A passage 39 leads for drainage purposes through both cheek plates 17, 18 and the cam ring 19 and connects with one of the passages 38.

The cheek plates 17, 18 have central bores which must be reasonably tightly sealed to the shaft 31, and for this purpose use is made of the combined bushing and seal structure described and claimed in application Serial No. 253,388, filed October 8, 1951, now Patent No. 2,710,581. Each bushing 41 makes a good running fit on shaft 31 and is movable in the central bore of the corresponding cheek plate. A coil compression spring 43 reacts between the cheek plate and an external flange on the bushing. A sealing ring 44, L-shaped in cross section encircles the outer end of the bushing, and has a floating mounting thereon afforded by the toric gasket 45 preferably of synthetic rubber. The ring 44 seals with a shoulder 46 on part 15 or 16 as the case may be.

The rotor 28 (Fig. 2) has ten radial vane slots each terminating in an enlarged through bore 47 and each filled by a radially movable laminated vane made up of two plates 48, 49. These plates have on their contacting faces beveled edges, so that there is a radial channel 51, where the vanes contact the cheek plates 17 and 18 and an end channel 52 where the vanes contact the ring 19. Vanes in the idle zones, such as the vane at six o'clock in Fig. 2 nearly bottom on the bore 47, only two to three one-thousandths of an inch clearance being afforded. The clearance is exaggerated in Fig. 2 to avoid giving the impression that the vanes do bottom, which is not desired. Registering notches 53 are cut in the edges of plates 48, 49 to assure pressure equalization in the bottoms of the slots at all times.

The ring 19 can be better described after the porting of the cheek plates is set out, but as a preliminary to that it should be explained that the internal surfaces of the ring in the work zones and in the idle zones (indicated by legends in Fig. 2) are right circular cylinders unequal in radius, and that the internal surfaces of the ring in the transition zones are right, but non-circular, cylinders. The directrix of each transition zone is an ogee curve designed to merge into two concentric circular arcs unequal in radius.

Figure 5:
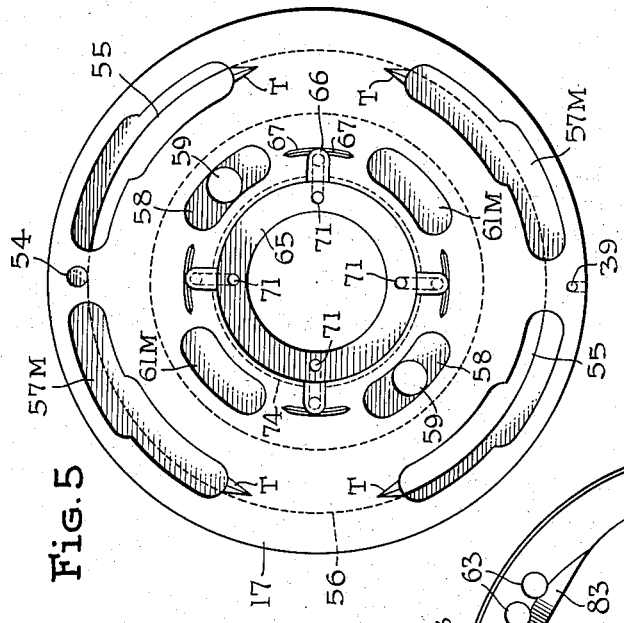
Fig. 5 is a similar view of the right hand check plate. These two plates are duplicates but are separately illustrated to permit differentiation of port functions for a given direction of rotation.
Figure 4:
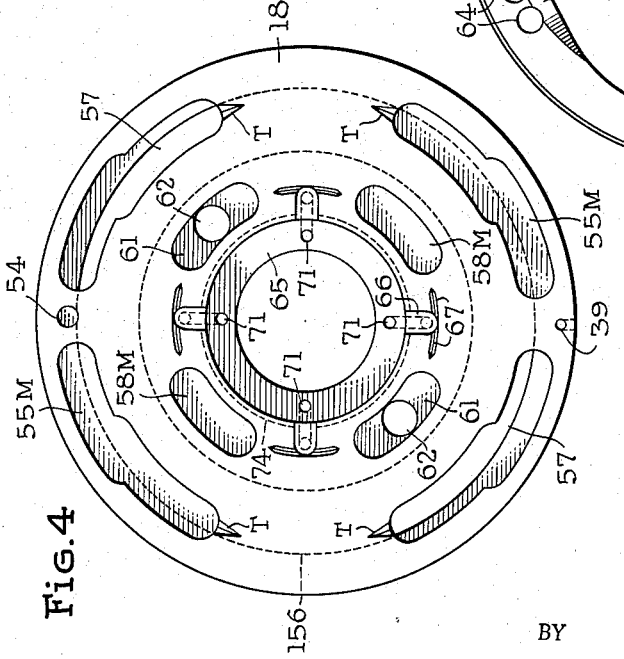
Fig. 4 is a face view of the left hand check plate of Fig. 1.

There are significant things about the faces of the cheek plates as illustrated in Figs. 4 and 5. In the first place they are duplicates in detail. As to port outline, each has line symmetry both as to the horizontal diameter and as to the vertical diameter. It follows that as to port outline they are also mirror duplicates.

Fig. 5 shows the plate 17 and Fig. 4 the plate 18. Their orientation when face to face with the ring 19 between them is fixed by a dowel filling holes 54. In the description it will be assumed for discussion that 26 is the inlet and 27 the discharge chamber so that 17 is the inlet plate and 18 the discharge plate. On that basis ports in Figs. 7, 8, and 9 will be numbered as in Fig. 5.

Referring now to Figs. 4, 5, 7, 8, and 9 the plate 17 has two arcuate main ports 55 which communicate with the annular channel 56 on the back of the plate and two blind balancing recesses 57M which are the same in contour as ports 55. Extending toward each other in the working zones (see Fig. 2) are slender tail extensions T leading from proximate ends of the ports 55 and recesses 57M.

Located radially inward from ports 55 are arcuate loading ports 58 fed by passages 59 drilled through the plate. Similarly located radially inward from the recesses 57M are balancing recesses 61M.

Ports 55 in plate 17 face mirror image recesses 55M in plate 18. Recesses 57M are mirror images of ports 57 in plate 18 which communicate with groove 156 in the back of plate 18 identical with groove 56 in plate 17. The same is true as to 58 in plate 17 and 58M in plate 18. Recess 61M in plate 17 is a mirror image of port 61 in plate 18, from which passage 62 (similar to passage 59) leads through the plate. Ports 55 and 55M are connected by holes 63 drilled through ring 19. Holes 64 connect ports 57 and 57M.

Each plate has a counterbore 65 surrounding the central bore, with four radial arms 66 from which lead oppositely extended tail grooves 67 cut in the face of the plate. The counterbores in the two plates are connected freely by ports 68 drilled through the rotor 28 (see particularly Fig. 1). The ports and recesses 58, 58M, 61, 61M arms 66 and grooves 67 are all in the trace of the slot-bottom bores 47 in the rotor, so these determine the vane-loading pressures.

A series of diagonal ports 71 lead through the plates 17 and 18 to the plane shoulders of respective counterbores. On these shoulders seat annular plate valves 72 loaded by coil compression springs 73. These do not engage the rotor but have end coils which snap into annular channels 74. See Figs. 8 and 9 which best show the channels 74. The ports 71 in plate 17 lead from space 26 and those in plate 18 from space 27.

Consequently counterbores 65, arms 66 and tails 67 are always at a pressure slightly below supply pressure. The reduction of pressure is determined by the strength of spring 73.

To control flows back and forth between chamber 26 and groove 56 (and between chamber 27 and groove 156) use is made of the asymmetric flow valves shown in Figs. 1, 10, and 11. Annular plate 75 seats on cheek plate 17 and overlies groove 56. It is lightly loaded toward the cheek plate by springs 76 which react against housing part 15. Through plate 75 are two groups of ports 77 each controlled by an arcuate plate valve 78 which opens inward toward groove 56. Coil compression springs 79 heavier than springs 76 bias the valve closed. Springs 79 encircle stems 81 attached to the plate valve 78 and react between plate 75 and heads 82 carried by the stems. The construction just described as used with plate 17 is duplicated as to plate 18.

It functions as a pressure reducing valve to reduce the pressure of motive fluid supplied to main ports 55 (for reverse running, ports 57). It also offers moderate resistance to discharge from the intervane spaces.

It follows that the intervane pressures as the vanes pass through the working zone are always moderately less than the pressures then maintained in the vane slots. However, full supply pressure loads the vanes approaching a working zone through a transition zone.

Figure 6:
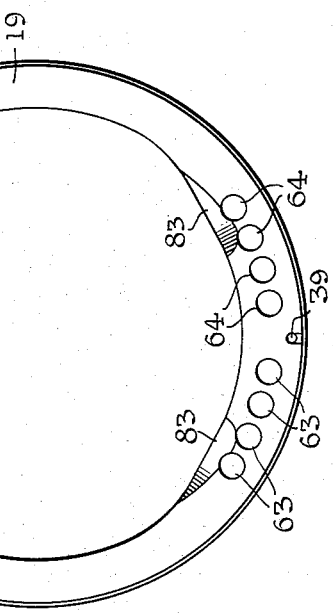
Fig. 6 is a face view of the cam ring. Both faces of the cam ring are identical.

While the ports 55 and 57, with their balancing recesses 55M and 57M can be used alone, it is preferred to bevel both sides of the ring as shown at the four points marked 83 in Fig. 6, so as to increase the port areas.

It should be observed that the intervane interval is approximately coextensive with the inlet and discharge ports, and likewise with the intervals between the tails T on the inlet and discharge ports which define the extent of the working zone.

For either direction of running all the inlet ports are in one plate and all the outlet ports are in the other. The vanes are loaded with full supply pressure while moving outward and are freely unloaded to discharge when moving inward. The valves 78 control the pressure of liquid delivered as motive fluid and the valves 75 impose a light back-pressure on discharge, which among other effects keeps the working spaces liquid filled. The connected spaces 66 are kept charged at all times, one of the valves 72 acting simply as a check valve to prevent outflow and the other having a pressure reducing function determined by the strength of its spring 73. In some cases, particularly where the clearance between the rotor and the cam ring is small through the idle zone the springs 73 may be quite weak.

All these effects are present for each direction of rotation. They assure freedom from vane hammering and vane chatter and ensure quiet operation. Wear on ring and vanes is less and the volumetric efficiency is good. The advantages over prior known constructions are particularly noticeable where high pressures are used and the rotary speed is high.

What is claimed is:

1. An expansible chamber motor of the vane type comprising in combination, a cylindrical rotor having spaced radial vane slots; vanes radially movable in said slots; rotor-enclosing structure having two flow connections, one serving for supply and the other for discharge, said structure comprising means affording a rotor-encircling vane track and cheek plates which embrace the sides of the rotor, said structure defining two diametrically opposite working zones, two diametrically opposite idle zones and interposed transition zones, said structure having main ports connecting opposite ends of said working zones with respective flow connections, each main port being approximately coextensive with the corresponding transition zone and with the vane-slot interval on the rotor, said cheek plates having ports located to communicate with the bottoms of the vane slots as the vanes pass successive transition zones, alternate one of said ports being in free communication with alternate ones of said flow connections whereby said ports serve respectively as vane-loading and vane-unloading ports, said cheek plates being further provided with maintaining ports which communicate with the bottoms of the vane-slots while the vanes are passing through the working zones and the idle zones; and distinct pressure reducing valve means arranged to be supplied with pressure fluid from the same one of said flow connections, one delivering with a moderate pressure reduction to said maintaining ports and the other effecting a larger pressure reduction and being interposed between the supplying flow connection and the connected main port.

2. The combination defined in claim 1 in which the radial length of the vanes and the radial depth of the vane slots are so nearly equal that the vanes aproximately bottom in the slots as the vanes pass through the idle zones.

3. An expansible chamber motor of the vane type comprising in combination, a cylindrical rotor having spaced radial vane slots; vanes radially movable in said slots; rotor-enclosing structure having two flow connections, one serving for supply and the other for discharge, said structure comprising means affording a rotor-encircling vane track and cheek plates which embrace the sides of the rotor, said structure defining two diametrically opposite working zones, two diametrically opposite idle zones and interposed transition zones, said structure having main ports connecting opposite ends of said working zones with respective flow connections, each main port being approximately coextensive with the corresponding transition zone and with the vane-slot interval on the rotor, said cheek plates having ports located to communicate with the bottoms of the vane slots as the vanes pass successive transition zones, alternate ones of said ports being in free communication with alternate ones of said flow connections whereby said ports serve respectively as vane-loading and vane-unloading ports, said cheek plates being further provided with maintaining ports which communicate with the bottoms of the vane-slots while the vanes are passing through the working zones and the idle zones, said ports having their largest flow capacity at midlength of said zones and having tapered restricted extensions toward said vane loading and unloading ports; and distinct pressure reducing valve means arranged to be supplied with pressure fluid from the same one of said flow connections, one delivering with a moderate pressure reduction to said maintaining ports and other effecting a larger pressure reduction and being interposed between the supplying flow connection and the connected main port.

4. An expansible chamber motor of the vane type comprising in combination, a cylindrical rotor having spaced radial vane slots; vanes radially movable in said slots; rotor-enclosing structure having two flow connections, one serving for supply and the other for discharge, said structure comprising means affording a rotor-encircling vane track and cheek plates which embrace the sides of the rotor, said structure defining two diametrically opposite working zones, two diametrically opposite idle zones and interposed transition zones, said structure having main ports connecting opposite ends of said working zones with respective flow connections, each main port being approximately coextensive with the corresponding transition zone and with the vane-slot interval on the rotor, said cheek plates having ports located to communicate with the bottoms of the vane slots as the vanes pass successive transition zones, alternate ones of said ports being in free communication with alternate ones of said flow connections whereby said ports serve respectively as vane-loading and vane-unloading ports, said cheek plates being further provided with maintaining ports which communicate with the bottoms of the vane-slots while the vanes are passing through the working zones and the idle zones, said ports having their largest flow capacity at midlength of said zones, and having restricted extensions which approach said vane unloading and loading ports closely enough to be bridged and momentarily connected by passing vane slots; and distinct pressure reducing valve means arranged to be supplied with pressure fluid from the same one of said flow connections, one delivering with a moderate pressure reduction to said maintaining ports and the other effecting a larger pressure reduction and being interposed between the supplying flow connection and the connected main port.

References Cited in the file of this patent

UNITED STATES PATENTS

| 2,056,910 | Schauer | Oct. 6, 1936 |
| 2,255,784 | Kendrick | Sept. 16, 1941 |
| 2,487,321 | Ericson | Nov. 8, 1949 |
| 2,636,481 | Rosaen | Apr. 28, 1953 |
| 2,641,195 | Ferris | June 9, 1953 |